United States Patent [19]

Valentine

[11] 4,435,623
[45] Mar. 6, 1984

[54] TELEPHONE GUARD DEVICE

[76] Inventor: Michael J. Valentine, 37 Hillside Rd., Penfield, N.Y. 14526

[21] Appl. No.: 95,012

[22] Filed: Nov. 16, 1979

[51] Int. Cl.³ .............................................. H04M 1/66
[52] U.S. Cl. ................................................ 179/189 R
[58] Field of Search ........................ 179/189 R, 1 HS

[56] References Cited

U.S. PATENT DOCUMENTS 2,597,670  5/1952  Pinto ................................. 179/1 HS
3,124,664  3/1964  Beatty ............................. 179/189 R
3,823,277  7/1974  Rudolph ......................... 179/189 R
3,939,678  2/1976  Wagoner ........................ 179/189 R Primary Examiner—George G. Stellar
Attorney, Agent, or Firm—M. LuKacher

[57] ABSTRACT

A device for guarding a telephone set against undesired use or accidental dislocation is fixably mounted between the cradles and has blades and a slide mechanism which is manually actuable to selectively extend and retract the blades into and out of blocking relationship with the switch hook buttons so as to render the telephone inoperable when desired.

11 Claims, 4 Drawing Figures

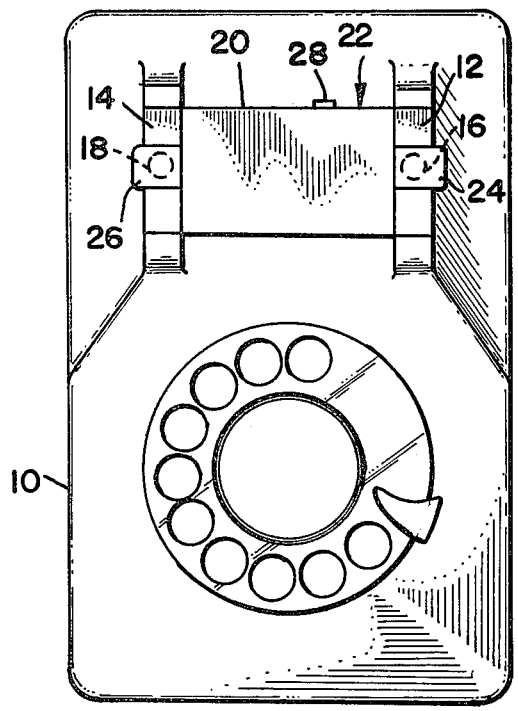
FIG. 1
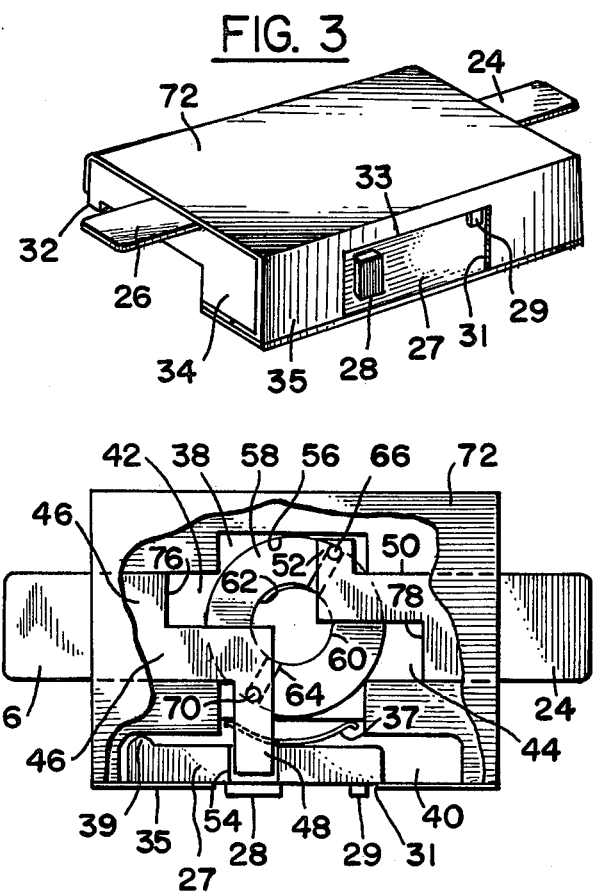
FIG. 3
FIG. 2
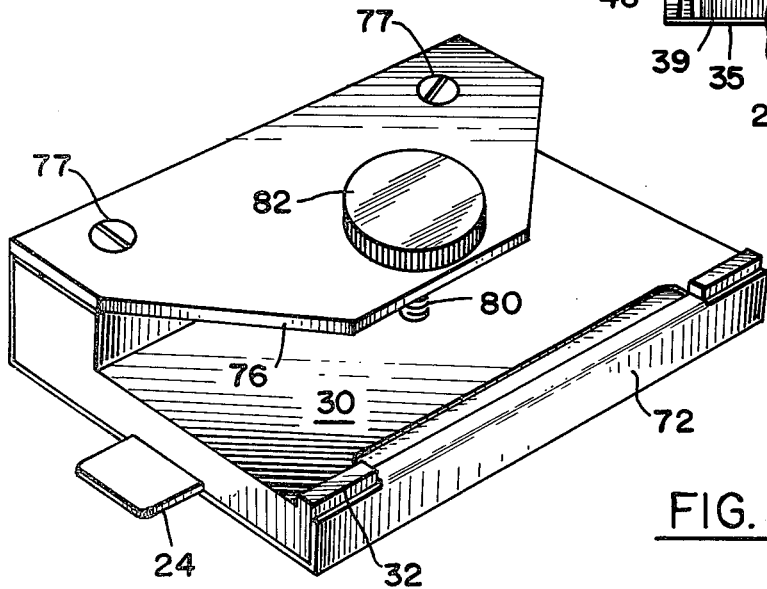
FIG. 4

TELEPHONE GUARD DEVICE

DESCRIPTION

The present invention relates to a device for maintaining a telephone continually in an on-hook condition and particularly to a device for selectively preventing and allowing the release of the switch hook buttons which are located in the cradle of a telephone set.

The invention is especially suitable for use in applications where a telephone may be used as a play thing by small children and prevents the telephone line from being left in an off-hook condition so that callers receive a busy tone and cannot reach the called line. The device also prevents children from dialing out and reaching toll exchanges and otherwise bothering other parties.

The need for a device for guarding against undesired operation of a telephone set has long been recognized and many attempts to satisfy this need have been proposed. These include slidable clamps for holding the switch hook buttons (see Beatty, U.S. Pat. No. 3,124,664 and Horton, U.S. Pat. No. 3,526,730). Clamps which have to be removed in order to render the telephone set operable have also been proposed (see Medenbach, U.S. Pat. No. 2,864,906, Nimer, U.S. Pat. No. 3,069,513, Buckingham et al, U.S. Pat. No. 3,624,317, Benson, U.S. Pat. No. 2,641,659 and Richards, U.S. Pat. No. 3,712,964). In many of these devices such as the devices described in the Medenbach, Horton, Nimer and Beatty patents, springs are necessary to hold the devices on the telephone set and to selectively release the switch hook buttons. All of such devices have deficiencies in design, operational characteristics and cost which militate against their use. The need for a satisfactory device for guarding against undesired operation of a telephone set has, therefore, not heretofore been satisfied.

It is an object of the present invention to provide an improved device for guarding against undesired or accidental operation of a telephone set which has the following features:

1. Ease of operation by reason of a mechanism which activates or releases call guarding operation selectively, which can be manually operated without the need for manual dexterity and when the receiver (handset) is in the cradle thereby allowing one hand operation; the mechanism also being operable in an anatomically comfortable position and without twisting the hand so as to gain access to the device;

2. The elimination for the need for spring clamps;

3. The elimination of the possibility of damage to the telephone set such as scratching and marring of the set in operation;

4. Unobtrusive appearance without hanging parts which detract from the appearance of the telephone set;

5. The presentation of a flat surface for indicia, such as emergency telephone numbers or advertisements;

6. The need for only one time assembly on the telephone set, with disassembly difficult by small children;

7. Universal application to desk model telephone sets available from most manufacturers.

Briefly described, a device embodying the invention selectively maintains a telephone set having one or more switch hook buttons, which release when a handset is lifted off its cradles, in a first condition to go off hook when the handset is lifted and also in a second condition to remain on hook even though the handset is lifted. The device makes use of a body having mounting means for attaching the body and the device in a fixed position on the telephone adjacent to the cradles and particularly on a platform between the cradles having the switch hook buttons. At least one blade is slidably mounted in the body and is movable between retracted and extended positions out of and into blocking relationship with the switch hook buttons. A manually actuable slide mechanism is movably mounted in the body and is coupled to the blade for selectively extending and retracting the blade to selectively provide either condition of operation as may be desired. The slide actuation may be accomplished with a button positioned in the rear of the device so as to be out of view and unobtrusive to small children who might want to defeat the purpose of the device.

The foregoing and other features, objects and advantages of the invention as well as presently preferred embodiments thereof will become more apparent from a reading of the following detailed description in connection with the accompanying drawings in which:

FIG. 1 is a plan view of a telephone set base with the handset removed showing a device provided in accordance with an embodiment of the invention mounted thereon;

FIG. 2 is a plan view of the device shown in FIG. 1 with the cover partially removed and showing blades in extended position where they block the release of the switch hook buttons of the telephone set;

FIG. 3 is a perspective view of the device taken from the rear; and

FIG. 4 is a perspective bottom view of the device taken from the front.

Referring more particularly to FIGS. 1–4 the drawings, there is shown the base of a telephone set 10 having cradles 12 and 14 for the handset (not shown). The switch hook buttons 16 and 18 are spring biased in the upward direction and are located in the cradles 12 and 14. A platform 20 between the cradles provides the base on which the guard device 22 provided by the invention is mounted. This device has a pair of blades 24 and 26 shown in FIG. 1 in the extended position blocking the releasing of the switch hook buttons 16 and 18. These blades are selectively actuated by a slide 27. A button 28 on the slide 27 extends from the rear edge of the device and is movable laterally to extend and retract the blades 24 and 26 as desired.

A body 30 which may be injection molded from plastic has the blades 24 and 26 as well as the slide 27 mounted therein. The body 30 has a shorter lip 32 along its front edge and a longer lip 34 along its rear edge as shown in FIG. 3. A recess 38 in the top surface of the body 30 extends into another slot 40 along the rear edge of the body. Still other slots 42 and 44 extend laterally between the sides of the body 30. Blade 26 is slidably mounted in the slot 42. Blade 24 is slidably mounted in the slot 44. The blade 26 has a leg 46 in the slot 42 and a perpendicular leg 48 which is located in the recess 38. The other blade 24 also has two legs, 50 and 52, with leg 52 perpendicular to the leg 50. The slide 27 has a slot 54 into which the leg 48 of the blade 26 extends. The depth of the slots 42 and 44 as well as the depth of the recess 38 does not exceed the thickness of the blades.

A circular slot 56 extends from the top surface of the body 30 into the region of the central recess 38. A circular disk 58 having a thickness which does not exceed the depth of the slot 56 is rotatable in the slot 56. A stud 60 may be located in a hole 62 in the body and in the disk 58 for maintaining the disk centered in the slot 56. The stud may be omitted if desired. A radial slot 64 extends diametrically across the top of the disk 58. Pins 66 and 70, which are attached to the blades 24 and 26, extend into the slot 64.

When the slide 27 is moved to the left from its central position as shown in FIG. 2, the blade 26 moves to the left, and the pin 70 causes the disk 58 to rotate clockwise which causes the blade 24 to move to the right, i.e. in an opposite direction from the blade 26. The blades are therefore extended into blocking relationship with the switch hook buttons 16 and 18 (FIG. 1). Movement of the slide 27 by manual actuation of the button 28 to right shifts blades 24 and 26 inwardly toward each other and again in opposite directions to retract the blades. Actuation of the blades can be accomplished when the handset is located on the cradles, i.e. without lifting the handset. This is because the tops of the buttons 16 and 18 are radiused and may be cammed down or up by the blades as they extend outwardly or retract inwardly. The slide actuation button 28 is disposed at the rear of telephone set and is easily accessible by manual actuation by the fingers.

A cover 72 overlaps the top surface of the body 30 and extends around the front and rear edges over the body. The cover contains the blades 24 and 26, the circular disk 58 and the slide within the body 30. The blades 24 and 26 have notches 76 and 78 in the corners thereof which overlap when the blades are retracted. This enables the blades to be retracted closer to each other. The notches 76 and 78 afford room for the overlapped relationship of the blades 24 and 26.

The device 22 is clamped to the platform 20 by a clamp plate 76 which is attached to the lip 34 along the rear edge of the body 30 by screw 77. The lip 34 defines a step of sufficient height to receive platform 20. A screw 80 which is rotated by a knurled knob 82 is threaded into the clamp plate 76. A stud (not shown) at the top of the screw 80 prevents the screw from being released from the clamp plate 76. The knob 82 is used to permanently fix the device in place on the platform 20. Once the clamp screw 80 is tightened it is difficult to remove, especially by small children. The device may be left in place on the telephone set since it is unobtrusive. The top surface of the cover 72 may be marked with indicia such as emergency telephone numbers and advertisements by the orthography or other printing means.

In order to prevent inadvertent or accidental displacement of the blades 22 and 24 inwardly from their extended position, the slide 27 has a stub 29 which is stopped by a side 31 of an opening 33 in the rear 35 of the cover 72 (See FIG. 3) when the slide is in the position where the blades 24 and 26 are extended, as shown in FIG. 2.

The slide 27 is biased against the rear side 35 of the cover 72 by a bowed spring 37 which does not interfere with the lateral shifting of the slide 27. The slide has a radiused tab 39 on the inside thereof to provide a pivot for the slide 27. By pivoting the slide 27 inwardly against the bias of the spring 37, about the tab 39, the stub 29 is released to slip under the rear side 35, thus the blades 24 and 26 may be retracted.

From the forgoing description it will be apparent that there has been provided an improved device for guarding a telephone against being operated when operation thereof is not desired. The guard can easily be released when the telephone is to be put into use. Sufficient clearance is provided for telephone sets having platforms of various sizes and shapes such that the device is essentially universal in application to any desk model telephone sets produced by various manufacturers.

Variations and modifications of the herein described device will undoubtedly suggest themselves to those skilled in the art. Accordingly, the foregoing description should be taken as illustrative and not in a limiting sense.

I claim:

1. A device for selectively maintaining a telephone set having at least one switch hook button which is released when a handset is lifted off its cradle in a first condition to go off hook when the handset is lifted and in a second condition to remain on hook even though the handset is lifted, said device comprising a body having mounting means for retaining said body in fixed position on said telephone adjacent to said cradles, at least one blade slidably mounted in said body and movable laterally between retracted and extended positions out of and into blocking relationship with said switch hook button, and means including a manually actuable slide movably mounted in said body and coupled to said blade for selectively extending and retracting said blade to selectively provide said second and first conditions, respectively.

2. The invention as set forth in claim 1 wherein said means for selectively extending and retracting said blade includes a first leg of said blade which extends in a lateral direction in which said blade is movable, and a second leg which extends in a direction perpendicular thereto, said second leg being disposed in said slide and being movable therewith.

3. The invention as set forth in claim 1 wherein said body has a circular slot therein, said means for selectively extending and retracting said blade further including a disk rotatably disposed in said circular slot, said blade having first and second legs which extend in a lateral direction in which said blade is movable and in a direction prependicular to said lateral direction, respectively, said slide having a slot therein in which said second leg of said blade is disposed, said blade having a pin therein, said pin being rotatably disposed in said disk, a second blade slidably mounted in said body and movable in said lateral direction between retracted and extended positions out of and into blocking relationship with a second switch hook button of said telephone set, second blade having a second pin therein, said second pin also being rotatably disposed in said disk whereby said blades move in opposite directions into their extended and retracted positions and into and out of blocking relationship with said switch hook buttons.

4. The invention as set forth in claim 3 wherein said circular disk is slotted along a diameter thereof, said pins of said first named and second blades extending and being disposed in the slot of said disk on opposite sides of the center of said disk.

5. The invention as set forth in claim 3 wherein said first blade and said second blade each have overlapping portions, notches in said first and second blades in said overlapping portions which notches receive each other such that the distance in the lateral direction which said blades occupy when in their retracted position is reduced by the length of said notches in the lateral direction.

6. The invention as set forth in claim 3 wherein said body has a recess in the top surface thereof having a certain depth, said body also having a slot in said top surface which extends in said lateral direction along a rear edge of said body, said slide being disposed in said rear edge slot, said circular slot being disposed in the region of said body having said recess, said circular slot having a depth which is not greater than the thickness of said disk such that said disk is disposed in said recess, second slots in said top surface of said body in which said first and second blades are disposed and which extend laterally in opposite directions from said recess, and said blade slots having a depth greater than the thickness of said blades.

7. The invention as set forth in claim 6 further comprising a cover over said top surface of said body closing said recess and said slots and retaining said disk and blades therein, said cover overlapping said rear edge and the front edge of said body to retain said slide in said cover upon said body.

8. The invention as set forth in claim 7 wherein the portion of said cover overlapping said rear edge has an opening therein, said slide having a button attached thereto and projecting through said cover opening.

9. The invention as set forth in claim 8 wherein said slide has a stub on the outside thereof which clears one side of said cover opening when said blades are extended, said slide having a tab on the inside thereof about which said slide is pivotable away from said cover rear edge to clear said one side of said cover opening and permit said slide to be shifted in a direction to retract said blades, and a spring between said body and said inside of said slide biasing said slide toward said cover rear edge.

10. The invention as set forth in claim 1 wherein said means for attaching said body includes a lip along the rear edge thereof where said slide is located defining a step having a height greater than the thickness of said platform between the cradles of the telephone set, a clamp plate attached to said lip and underlying said body to receive said platform between said body and said plate, a clamping screw threadedly received in said plate and disposed with its axis extending between said plate and said body for securing said body in said fixed position to said platform between said cradles.

11. The invention as set forth in claim 10 further comprising a knurled knob attached to said screw on the side of said plate opposite to said body for rotating said screw to clamp and unclamp said device from said telephone set.

* * * * *